US012249449B2

(12) United States Patent
Sano

(10) Patent No.: US 12,249,449 B2
(45) Date of Patent: Mar. 11, 2025

(54) SOFT MAGNETIC POWDER, DUST CORE, MAGNETIC ELEMENT, ELECTRONIC DEVICE, AND VEHICLE

(71) Applicant: Seiko Epson Corporation, Tokyo (JP)

(72) Inventor: Toshiki Sano, Hachinohe (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/742,430

(22) Filed: May 12, 2022

(65) Prior Publication Data

US 2022/0367091 A1 Nov. 17, 2022

(30) Foreign Application Priority Data

May 13, 2021 (JP) ................................ 2021-081453

(51) Int. Cl.
*H01F 1/06* (2006.01)
*H01F 1/01* (2006.01)
*H01F 1/20* (2006.01)

(52) U.S. Cl.
CPC ..................................... *H01F 1/01* (2013.01)

(58) Field of Classification Search
CPC ..... H01F 1/01; H01F 1/06; H01F 1/20; H01F 1/15333
See application file for complete search history.

(56) References Cited

U.S. PATENT DOCUMENTS 8,866,579 B2 10/2014 Hachiya et al.
2008/0292862 A1* 11/2008 Filippov ................... H01F 1/28 428/221
2013/0127576 A1 5/2013 Hachiya et al.
(Continued)

FOREIGN PATENT DOCUMENTS

CN 111508679 A 8/2020
EP 3024000 A1 5/2016
JP 2003-234206 A 8/2003
(Continued)

OTHER PUBLICATIONS

Machine translation of JP2020-095988A, 14 pages. (Year: 2020).*

*Primary Examiner* — Matthew E. Hoban
*Assistant Examiner* — Lynne Edmondson
(74) *Attorney, Agent, or Firm* — Harness, Dickey & Pierce, P.L.C.

(57) ABSTRACT

There is provided a soft magnetic powder in which when a volume-based particle size distribution is measured by a laser diffraction scattering type particle size distribution measuring device, and the particle size distribution is plotted in an orthogonal coordinate system in which a horizontal axis represents a particle diameter and a vertical axis represents a relative particle amount to draw a particle size distribution curve, the particle size distribution curve has a first peak having a local maximum at a particle diameter D1 [μm] and a second peak having a local maximum at a particle diameter D2 [μm] that is larger than the particle diameter D1, the particle diameter D1 is in a range of 1.0 μm or more and 16.0 μm or less, and a difference D2−D1 between the particle diameter D1 and the particle diameter D2 satisfies the following formulas (A-1) and (A-2).

$$D2-D1=k1\times D1 \quad \text{(A-1)}$$

$$1.0\leq k1\leq 15.0 \quad \text{(A-2)}$$

4 Claims, 8 Drawing Sheets

(56) References Cited

U.S. PATENT DOCUMENTS

| | | | | |
|---|---|---|---|---|
| 2015/0145911 | A1* | 5/2015 | Kashimura | .......... B41J 2/04541<br>347/10 |
| 2020/0243236 | A1 | 7/2020 | Kudo | |

FOREIGN PATENT DOCUMENTS

| | | | |
|---|---|---|---|
| JP | 2013-110171 | A | 6/2013 |
| JP | 2016-012630 | A | 1/2016 |
| JP | 2018-113340 | A | 7/2018 |
| JP | 2018-113341 | A | 7/2018 |
| JP | 2020-095988 | A | 6/2020 |
| WO | 2015/008813 | A1 | 1/2015 |
| WO | 2020/217476 | A1 | 10/2020 |

* cited by examiner

SOFT MAGNETIC POWDER, DUST CORE, MAGNETIC ELEMENT, ELECTRONIC DEVICE, AND VEHICLE

The present application is based on, and claims priority from JP Application Serial Number 2021-081453, filed May 13, 2021, the disclosure of which is hereby incorporated by reference herein in its entirety.

BACKGROUND

1. Technical Field

The present disclosure relates to a soft magnetic powder, a dust core, a magnetic element, an electronic device, and a vehicle.

2. Related Art

JP-A-2003-234206 discloses a soft magnetic solid material obtained by compressing and solidifying a soft magnetic powder including an insulating coating film, and discloses that, from the viewpoint of a filling rate of the powder, a bimodal powder mixture system having two particle diameter peaks is used as the soft magnetic powder. Accordingly, a density of the soft magnetic solid material can be increased. Further, by increasing the density, a magnetic permeability of the soft magnetic solid material can be increased.

However, JP-A-2003-234206 does not explicitly describe how to set two particle diameter peaks in the bimodal powder mixing system. The particle diameter peak affects filling properties and core loss. Therefore, it is necessary to optimize the two particle diameter peaks.

SUMMARY

A soft magnetic powder according to an application example of the present disclosure is provided, in which when a volume-based particle size distribution is measured by a laser diffraction scattering type particle size distribution measuring device, and the particle size distribution is plotted in an orthogonal coordinate system in which a horizontal axis represents a particle diameter and a vertical axis represents a relative particle amount to draw a particle size distribution curve, the particle size distribution curve has a first peak having a local maximum at a particle diameter D1 [μm] and a second peak having a local maximum at a particle diameter D2 [μm] that is larger than the particle diameter D1, the particle diameter D1 is in a range of 1.0 μm or more and 16.0 μm or less, and a difference D2−D1 between the particle diameter D1 and the particle diameter D2 satisfies the following formulas (A-1) and (A-2).

$$D2-D1=k1\times D1 \quad \text{(A-1)}$$

$$1.0\le k1\le 15.0 \quad \text{(A-2)}$$

A dust core according to an application example of the present disclosure contains the soft magnetic powder according to the application example of the present disclosure.

A magnetic element according to an application example of the present disclosure includes the dust core according to the application example of the present disclosure.

An electronic device according to an application example of the present disclosure includes the magnetic element according to the application example of the present disclosure.

A vehicle according to an application example of the present disclosure includes the magnetic element according to the application example of the present disclosure.

DESCRIPTION OF EXEMPLARY EMBODIMENTS

Hereinafter, a soft magnetic powder, a dust core, a magnetic element, an electronic device, and a vehicle according to the present disclosure will be described in detail based on the accompanying drawings.

1. Soft Magnetic Powder

First, a soft magnetic powder according to an embodiment will be described.

The soft magnetic powder according to the embodiment is a powder containing soft magnetic particles and having a bimodal distribution in which a particle size distribution curve has two peaks.

Specifically, first, in the soft magnetic powder according to the embodiment, when a volume-based particle size distribution is measured by a laser diffraction scattering type particle size distribution measuring device, the obtained particle size distribution curve PSD has the following characteristics. The particle size distribution curve PSD is a curve that can be drawn when the measured particle size distribution is plotted in an orthogonal coordinate system in which a horizontal axis represents a particle diameter and a vertical axis represents a relative particle amount. Examples of the laser diffraction scattering type particle size distribution measuring device include Microtrac HRA9320-X100 manufactured by Nikkiso Co., Ltd.

Figure 1:
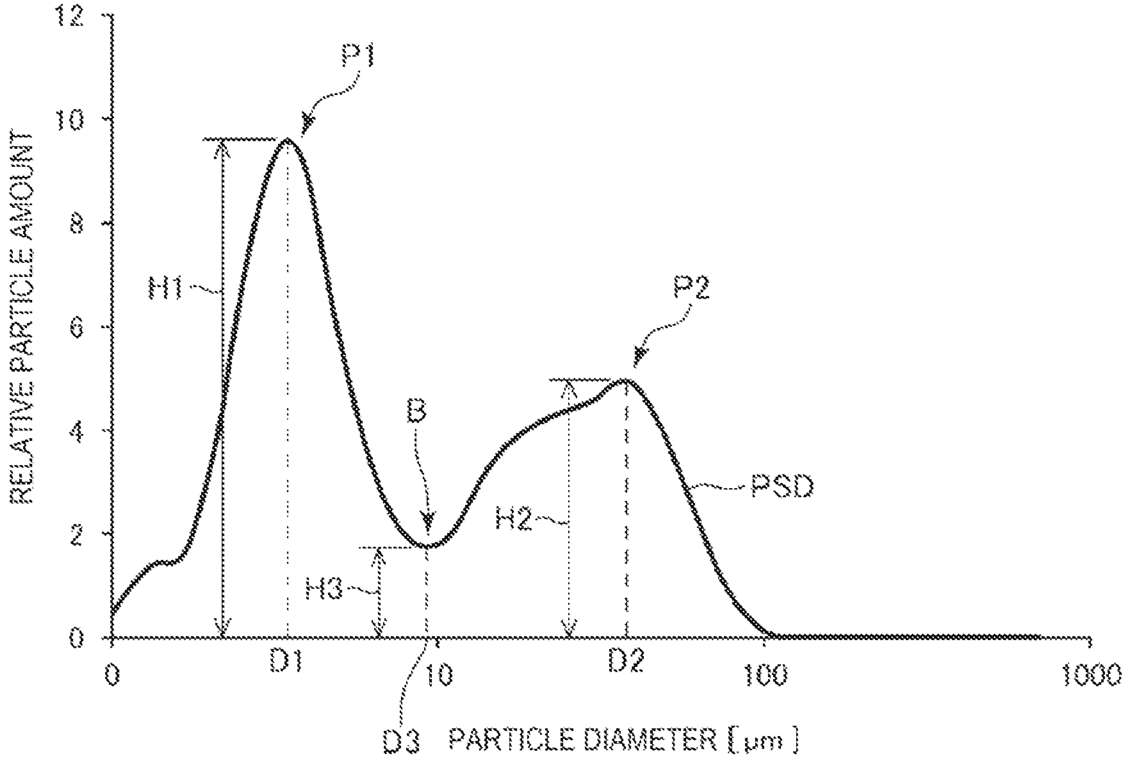
FIG. 1 is a diagram showing an example of a particle size distribution curve PSD obtained for a soft magnetic powder according to an embodiment.

FIG. 1 is a diagram showing an example of the particle size distribution curve PSD obtained for the soft magnetic powder according to the embodiment.

The particle size distribution curve PSD shown in FIG. 1 is a curve having a first peak P1 having a local maximum at a particle diameter D1 [μm] and a second peak P2 having a local maximum at a particle diameter D2 [μm] that is larger than the particle diameter D1. The particle diameter D1 is in a range of 1.0 μm or more and 16.0 μm or less. In addition, a difference D2−D1 between the particle diameter D1 and the particle diameter D2 satisfies the following formulas (A-1) and (A-2).

$$D2-D1=k1\times D1 \quad \text{(A-1)}$$

$$1.0\leq k1\leq 15.0 \quad \text{(A-2)}$$

In such a soft magnetic powder, since bimodal properties are optimized, a particle diameter balance between large diameter particles and small diameter particles is good, and the diameter is small as a whole. Therefore, the soft magnetic powder according to the embodiment is a powder that has good filling properties and that can manufacture a compact having a small eddy current loss when used in a high frequency band. As a result, a compact having good magnetic properties such as magnetic permeability and magnetic flux density and low core loss can be realized. Examples of the compact include a dust core, a powder magnetic sheet, and a powder magnetic film.

The first peak P1 has a local maximum at the particle diameter D1 [μm] as described above. The particle diameter D1 is in the range of 1.0 μm or more and 16.0 μm or less, preferably in the range of 1.0 μm or more and 10.0 μm or less, and more preferably in the range of 1.0 μm or more and 8.0 μm or less.

When the particle diameter D1 is less than the lower limit value described above, the filling properties of the soft magnetic powder are reduced, and the magnetic properties of the compact are reduced. On the other hand, when the particle diameter D1 is more than the upper limit value described above, the eddy current loss is increased in the particles in the compact when the powder is used in a high frequency band.

The second peak P2 has a local maximum at the particle diameter D2 [μm] as described above. A coefficient k1 included in the formula (A-1) satisfies the formula (A-2), preferably satisfies the following formula (A-3), and more preferably satisfies the following formula (A-4).

$$2.0\leq k1\leq 14.0 \quad \text{(A-3)}$$

$$4.0\leq k1\leq 12.0 \quad \text{(A-4)}$$

When the coefficient k1 is less than the lower limit value, the first peak P1 and the second peak P2 approach each other. Therefore, the balance between the large diameter particles and the small diameter particles is lost, and the filling properties of the soft magnetic powder are reduced. On the other hand, when the coefficient k1 is more than the upper limit value, the first peak P1 and the second peak P2 are separated from each other. Therefore, the balance between the large diameter particles and the small diameter particles is lost, and the filling properties of the soft magnetic powder are reduced. In addition, when the particle diameter D2 becomes too large and the powder is used in a high frequency band, the eddy current loss is likely to be increased in the particles in the compact.

In addition, the particle diameter D2 is preferably in a range of 15.0 μm or more and 50.0 μm or less, more preferably 25.0 μm or more and 45.0 μm or less, and still more preferably 28.0 μm or more and 40.0 μm or less.

When the particle diameter D2 is in the above range, the particle diameter balance between the large diameter particles and the small diameter particles can be further enhanced, and the particle diameter can be prevented from becoming too large as a whole. As a result, a soft magnetic powder that can improve the magnetic properties of the compact and reduce the core loss can be obtained.

A soft magnetic material constituting the soft magnetic powder may be one type or a mixture of two or more types. That is, since the soft magnetic powder is an aggregate of a large number of soft magnetic particles, and may be in the form of a mixed powder including particles made of a first soft magnetic material and particles made of a second soft magnetic material having an alloy composition different from that of the first soft magnetic material. By the mixed powder having two or more types of particles having different alloy compositions, a soft magnetic powder having magnetic properties derived from both the first soft magnetic material and the second soft magnetic material can be obtained. Therefore, for example, a compact having particularly high magnetic properties can be obtained.

The soft magnetic powder contains a soft magnetic material as a main material. Examples of the soft magnetic material include various Fe-based alloys such as an Fe—Si-based alloy such as pure iron and silicon steel, an Fe—Ni-based alloy such as permalloy, an Fe—Co-based alloy such as permendur, an Fe—Si—Al-based alloy such as sendust, an Fe—Cr—Si-based alloy, and an Fe—Cr—Al-based alloy, various Ni-based alloys, and various Co-based alloys. Among these, various Fe-based alloys are preferably used from the viewpoint of magnetic properties such as magnetic permeability and magnetic flux density, cost, and the like.

In addition, a crystal structure of the soft magnetic material is not particularly limited, and may be crystalline, amorphous, or microcrystalline (nanocrystalline).

A crystalline soft magnetic material is relatively inexpensive, and thus contributes to cost reduction of the soft magnetic powder. An amorphous soft magnetic material tends to have a higher magnetic permeability and a lower coercive force than the crystalline soft magnetic material, and thus contributes to improvement of the magnetic properties of the compact and reduction of the core loss. A microcrystalline soft magnetic material tends to have a higher magnetic permeability and a higher saturation magnetic flux density than the amorphous soft magnetic material, and thus contributes to further improvement of the magnetic properties of the compact.

Therefore, the soft magnetic powder preferably contains two or more types of particles having different crystal structures. Accordingly, a soft magnetic powder having two or more different properties depending on the crystal structure can be realized.

Among these, the soft magnetic powder preferably contains an amorphous soft magnetic material or a microcrystalline soft magnetic material. By containing the materials, the magnetic properties of the soft magnetic powder can be improved, and a low coercive force can be realized. As a result, a compact having particularly high magnetic properties and further reduced core loss can be realized.

In the soft magnetic powder, a powder containing an amorphous soft magnetic material as a main material and a powder containing a microcrystalline soft magnetic material as a main material may be mixed. Accordingly, a soft magnetic powder having the properties of both powders can be realized.

The microcrystalline soft magnetic material refers to a soft magnetic material containing crystal grains having a crystal grain diameter of 1.0 nm or more and 30.0 nm or less. In the microcrystalline soft magnetic material, a volume ratio of the crystal grains is preferably 30 vol % or more, and more preferably 40 vol % or more.

Examples of the amorphous soft magnetic material and the microcrystalline soft magnetic material include Fe-based alloys such as Fe—Si—B-based, Fe—Si—B—C-based, Fe—Si—B—Cr—C-based, Fe—Si—Cr-based, Fe—B-based, Fe—P—C-based, Fe—Co—Si—B-based, Fe—Si—B—Nb-based, Fe—Si—B—Nb—Cu-based, and Fe—Zr—B-based alloys, Ni-based alloys such as Ni—Si—B-based and Ni—P—B-based alloys, and Co-based alloys such as Co—Si—B-based alloys.

In the soft magnetic powder, the soft magnetic material is preferably the main material, and impurities may be contained in addition to the soft magnetic material. The main material refers to a material that accounts for 50 mass % or more of the particles of the soft magnetic powder. In addition, a content of the soft magnetic material in the particles of the soft magnetic powder is preferably 80 mass % or more, and more preferably 90 mass % or more.

In addition to the soft magnetic material, any additive may be added to the soft magnetic powder. Examples of such additives include various metal materials, various non-metal materials, and various metal oxide materials.

In FIG. 1, a height of the first peak P1 is represented by H1, and a height of the second peak P2 is represented by H2. The height H1 refers to a length from an origin to a peak top of the first peak P1 along the vertical axis of the orthogonal coordinate system in which the particle size distribution curve is drawn. The height H2 refers to a length from the origin to a peak top of the second peak P2 along the vertical axis. The height H2 preferably satisfies the following formulas (B-1) and (B-2).

$$H2=k2\times H1 \quad \text{(B-1)}$$

$$0.2\leq k2\leq 5.0 \quad \text{(B-2)}$$

In addition, a coefficient k2 included in the formula (B-1) satisfies the formula (B-2), preferably satisfies the following formula (B-3), and more preferably satisfies the following formula (B-4).

$$0.3\leq k2\leq 4.0 \quad \text{(B-3)}$$

$$0.4\leq k2\leq 2.0 \quad \text{(B-4)}$$

In the soft magnetic powder showing such a particle size distribution curve, a quantitative balance between particles belonging to the first peak P1 and particles belonging to the second peak P2 is optimized. Accordingly, a soft magnetic powder having particularly good filling properties can be realized.

When the coefficient k2 is less than the lower limit value, the volume ratio of the particles belonging to the first peak P1 becomes too large, and therefore, the quantitative balance between the particles belonging to the first peak P1 and the particles belonging to the second peak P2 is likely to be lost, and the filling properties may be reduced. On the other hand, when the coefficient k2 is more than the upper limit value, the volume ratio of the particles belonging to the second peak P2 becomes too large, and therefore, the above quantitative balance is likely to be lost, and the filling properties may be reduced. In addition, since the particle diameter becomes too large as a whole, when the powder is used in the high frequency band, the eddy current loss may be likely to be increased in the particles in the compact.

Further, the particle size distribution curve shown in FIG. 1 has a bottom portion B between the first peak P1 and the second peak P2. The bottom portion B has a local minimum at the particle diameter D3 between the particle diameter D1 and the particle diameter D2. In FIG. 1, a height of the bottom portion B is represented by H3. The height H3 refers to a length from the origin to the bottom of the bottom portion B along the vertical axis of the orthogonal coordinate system in which the particle size distribution curve is drawn. Further, the height H3 preferably satisfies the following formulas (C-1) and (C-2).

$$H3=k3\times H1 \quad \text{(C-1)}$$

$$k3\leq 0.9 \quad \text{(C-2)}$$

In addition, a coefficient k3 included in the formula (C-1) satisfies the formula (C-2), preferably satisfies the following formula (C-3), and more preferably satisfies the following formula (C-4).

$$0.1\leq k3\leq 0.8 \quad \text{(C-3)}$$

$$0.1\leq k3\leq 0.7 \quad \text{(C-4)}$$

In the soft magnetic powder showing such a particle size distribution curve, the particle size balance between the particles belonging to the first peak P1 and the particles belonging to the second peak P2 is optimized. Accordingly, a soft magnetic powder having particularly good filling properties can be realized.

When the coefficient k3 is less than the lower limit value, the quantitative balance between the particles belonging to the first peak P1 and the particles belonging to the second peak P2 is likely to be lost, and the filling properties may be reduced. On the other hand, when the coefficient k3 is more than the upper limit value, the effect of improving the filling properties due to the bimodal distribution may be reduced.

An insulating film may be provided at the surface of the particles of the soft magnetic powder as necessary. Examples of the insulating film include a glass material, a ceramic material, and a resin material.

The number of peaks of the particle size distribution curve of the soft magnetic powder is not limited to two, and may be three or more. That is, when a particle size distribution curve is drawn for the soft magnetic powder, the particle size distribution curve may have a multimodal distribution. When the particle size distribution curve has three or more peaks, one of two adjacent peaks may be set as the first peak P1, and the other may be set as the second peak P2.

2. Method for Manufacturing Soft Magnetic Powder

Next, an example of a method for manufacturing the above soft magnetic powder will be described.

The above soft magnetic powder is manufactured by a method of mixing a first powder and a second powder having an average particle diameter that is larger than that of the first powder.

Each of the first powder and the second powder may be a powder manufactured by any method. Examples of the method for manufacturing the soft magnetic powder include, in addition to various atomization methods such as a water atomization method, a gas atomization method, and a rotary water atomization method, a reduction method, a carbonyl method, and a pulverization method. Among these, as the first powder and the second powder, powders manufactured by an atomization method are preferably used. A fine powder having a good particle shape can be efficiently manufactured by the atomization method. Therefore, by using the powder (atomized powder) manufactured by the atomization method, a soft magnetic powder having particularly high filling properties can be obtained.

In addition, the first powder and the second powder may be manufactured by the same method, or may be manufactured by different methods. Since different properties of the powders to be manufactured by the manufacturing methods are often exerted, in the latter case, a plurality of properties desired to be imparted to the soft magnetic powder can be distributed to the first powder and the second powder. Accordingly, a soft magnetic powder having a plurality of properties that cannot be obtained by the same manufacturing method can be manufactured.

Specifically, an example is given in which the powder manufactured by the water atomization method is used as the first powder, and the powder manufactured by the rotary water atomization method is used as the second powder. In the water atomization method, since the water ejected at a high speed is caused to collide with the molten metal to be miniaturized, the first powder having a particularly small diameter can be efficiently manufactured. In the rotary water atomization method, since after a gas ejected at a high speed is caused to collide with the molten metal to be miniaturized, the molten metal can be caused to enter a rotating water stream to be rapidly cooled, a high cooling rate can be obtained even in the case of a powder having a diameter larger than that of the water atomization method. Therefore, it is possible to easily obtain an amorphous material having a high degree of amorphousness and a microcrystalline material having a small crystal size, and it is possible to efficiently manufacture the second powder having a low coercive force even in a composition having a high magnetic permeability and a high saturation magnetic flux density.

Due to such a difference in the manufacturing method, when the average particle diameters of the first powder and the second powder are equalized, for example, a specific surface area of the second powder can be reduced to about half of that of the first powder. This suggests that the powder manufactured by the rotary water atomization method has higher sphericity of the particles than the powder manufactured by the water atomization method.

In addition, due to the difference in the manufacturing method, for example, the coercive force of the second powder can be reduced to about half that of the first powder. This suggests that the cooling rate of the rotary water atomization method is higher than that of the water atomization method.

By using the first powder and the second powder, it is possible to easily obtain a soft magnetic powder capable of manufacturing a compact having good filling properties, good magnetic properties, and low core loss in a high frequency band.

The first powder and the second powder thus manufactured may be classified as necessary. Examples of a classification method include dry classification such as sieving classification, inertial classification, centrifugal classification, and air classification, and wet classification such as sedimentation classification.

A powder having a small coercive force is used as each of the first powder and the second powder. The coercive force of each of the first powder and the second powder is preferably 5.0 [Oe] (398 [A/m]) or less, and more preferably 3.0 [Oe] (239 [A/m]) or less. By using the first powder and the second powder each having such a small coercive force, it is possible to manufacture a compact capable of sufficiently reducing hysteresis loss even when the powder is used in a high frequency band.

The coercive force of the first powder and the second powder can be measured by, for example, a magnetization measuring device TM-VSM1230-MHHL manufactured by Tamakawa Co., Ltd.

3. Dust Core and Magnetic Element

Next, the dust core and the magnetic element according to the embodiment will be described.

The magnetic element according to the embodiment can be applied to various magnetic elements including a magnetic core, such as a choke coil, an inductor, a noise filter, a reactor, a transformer, a motor, an actuator, an electromagnetic valve, and an electric generator. In addition, the dust core according to the embodiment can be applied to the magnetic core included in the magnetic elements.

Hereinafter, two types of coil components will be representatively described as an example of the magnetic element.

3.1. Toroidal Type

First, a coil component of a toroidal type, which is an example of the magnetic element according to the embodiment, will be described.

Figure 2:
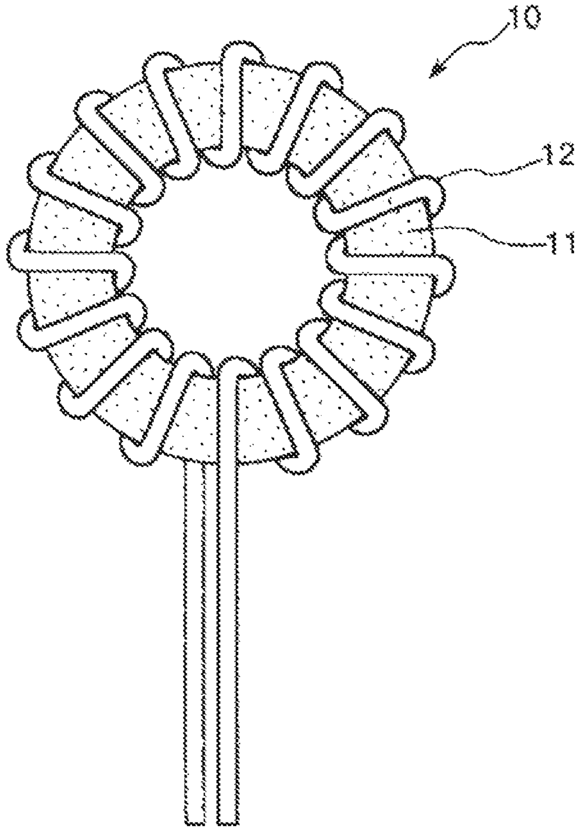
FIG. 2 is a plan view schematically showing a coil component of a toroidal type.

FIG. 2 is a plan view schematically showing the coil component of the toroidal type.

A coil component 10 shown in FIG. 2 includes a ring-shaped dust core 11 and a conductive wire 12 wound around the dust core 11. Such a coil component 10 is generally referred to as a toroidal coil.

The dust core 11 is obtained by mixing the soft magnetic powder according to the embodiment and a binder, supplying the obtained mixture to a molding die, and pressing and molding the mixture. That is, the dust core 11 is a compact containing the soft magnetic powder according to the embodiment. In such a dust core 11, the filling properties of the soft magnetic powder is good, and the eddy current loss is small when the powder is used in a high frequency band. Therefore, the coil component 10 including the dust core 11 has low core loss and high magnetic properties such as magnetic permeability and magnetic flux density. As a result, when the coil component 10 is mounted on an electronic device or the like, it is possible to reduce power consumption of the electronic device or the like and achieve high performance and miniaturization of the electronic device or the like.

Examples of a constituent material of the binder used in the manufacturing of the dust core 11 include organic materials such as silicone-based resins, epoxy-based resins, phenol-based resins, polyamide-based resins, polyimide-based resins, and polyphenylene sulfide-based resins, and inorganic materials such as phosphates such as magnesium phosphate, calcium phosphate, zinc phosphate, manganese phosphate, and cadmium phosphate, and silicates such as sodium silicate, and in particular, is preferably a thermosetting polyimide or an epoxy-based resin. The resin materials are easily cured by being heated and have excellent heat resistance. Therefore, the manufacturability and the heat resistance of the dust core 11 can be improved. The binder may be provided as necessary, and may be omitted.

In addition, a ratio of the binder to the soft magnetic powder slightly varies depending on the target magnetic properties and mechanical properties of the dust core 11 to be manufactured, the acceptable eddy current loss, and the like, and is preferably about 0.5 mass % or more and 5.0 mass % or less, and more preferably about 1.0 mass % or more and 3.0 mass % or less. Accordingly, it is possible to obtain the coil component 10 having excellent magnetic properties while sufficiently binding the particles of the soft magnetic powder to each other.

Various additives may be added to the mixture for any purpose as necessary.

Examples of a constituent material of the conductive wire 12 include a material having high conductivity, for example, a metal material containing Cu, Al, Ag, Au, Ni, and the like. In addition, an insulating film is provided at the surface of the conductive wire 12 as necessary.

A shape of the dust core 11 is not limited to the ring shape shown in FIG. 2, and may be, for example, a shape in which the ring is partially lost, a shape in which the shape in the longitudinal direction is linear, a sheet shape, a film shape, or the like.

In addition, the dust core 11 may contain a soft magnetic powder or a non-magnetic powder other than the soft magnetic powder according to the above embodiment as necessary.

As described above, the coil component 10, which is a magnetic element, includes the dust core 11 containing the above soft magnetic powder. Accordingly, the coil component 10 having low core loss and excellent magnetic properties can be realized.

3.2. Closed Magnetic Circuit Type

Next, a coil component of a closed magnetic circuit type, which is an example of the magnetic element according to the embodiment, will be described.

Figure 3:
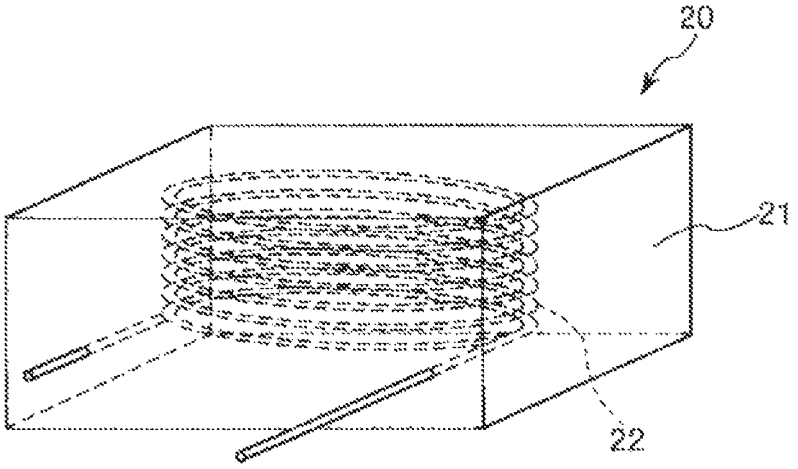
FIG. 3 is a transparent perspective view schematically showing a coil component of a closed magnetic circuit type.

FIG. 3 is a transparent perspective view schematically showing the coil component of the closed magnetic circuit type.

Hereinafter, the coil component of the closed magnetic circuit type will be described, and in the following description, differences from the coil component of the toroidal type will be mainly described, and descriptions of the same matters will be omitted.

As shown in FIG. 3, a coil component 20 according to the present embodiment is formed by embedding a conductive wire 22 formed in a coil shape in a dust core 21. That is, the coil component 20, which is a magnetic element, includes the dust core 21 containing the above soft magnetic powder, and is formed by molding the conductive wire 22 with the dust core 21. The dust core 21 has the same configuration as that of the above dust core 11. Accordingly, the coil component 20 having low core loss and excellent magnetic properties can be realized.

The coil component 20 in such a form can be easily obtained in a relatively small size. In addition, the coil component 20 has high magnetic properties and low core loss. Therefore, when the coil component 20 is mounted on an electronic device or the like, it is possible to reduce power consumption of an electronic device or the like and achieve high performance and miniaturization of the electronic device or the like.

In addition, since the conductive wire 22 is embedded in the dust core 21, a gap is less likely to be formed between the conductive wire 22 and the dust core 21. Therefore, vibration due to magnetostriction of the dust core 21 can be prevented, and generation of noise due to the vibration can also be prevented.

A shape of the dust core 21 is not limited to the shape shown in FIG. 3, and may be a sheet shape, a film shape, or the like.

In addition, the dust core 21 may contain a soft magnetic powder or a non-magnetic powder other than the soft magnetic powder according to the above embodiment as necessary.

4. Electronic Device

Next, an electronic device including the magnetic element according to the embodiment will be described with reference to FIGS. 4 to 6.

Figure 4:
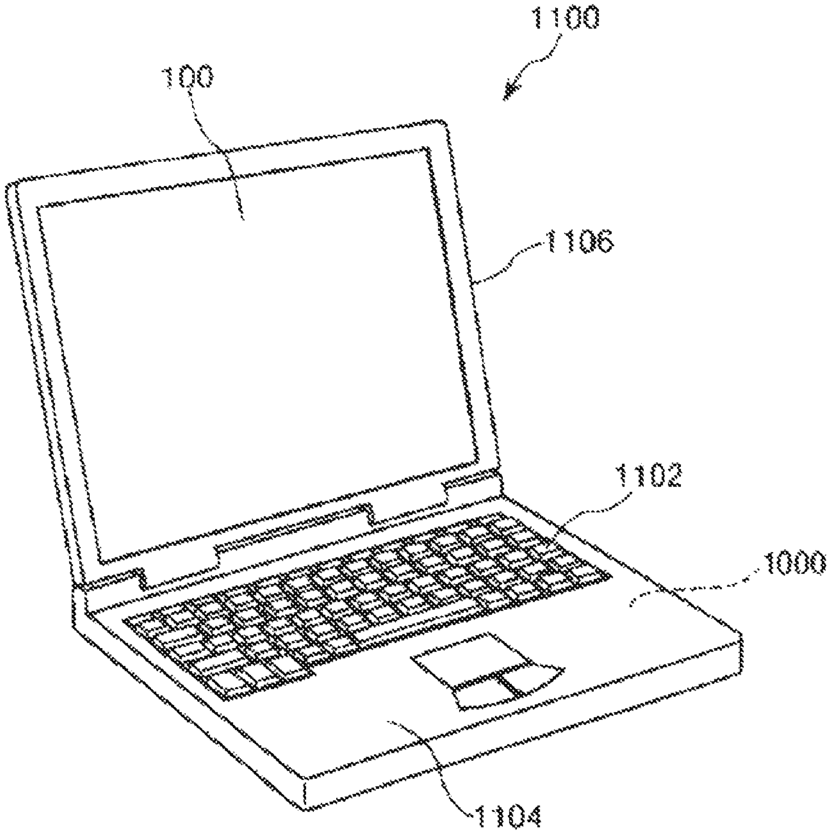
FIG. 4 is a perspective view showing a mobile personal computer which is an electronic device including a magnetic element according to the embodiment.

FIG. 4 is a perspective view showing a mobile personal computer which is an electronic device including the magnetic element according to the embodiment. A personal computer 1100 shown in FIG. 4 includes a main body 1104 including a keyboard 1102 and a display unit 1106 including a display 100. The display unit 1106 is rotatably supported by the main body 1104 via a hinge structure. Such a personal computer 1100 is incorporated with a magnetic element 1000 such as a choke coil or, an inductor for a switching power supply, and a motor.

Figure 5:
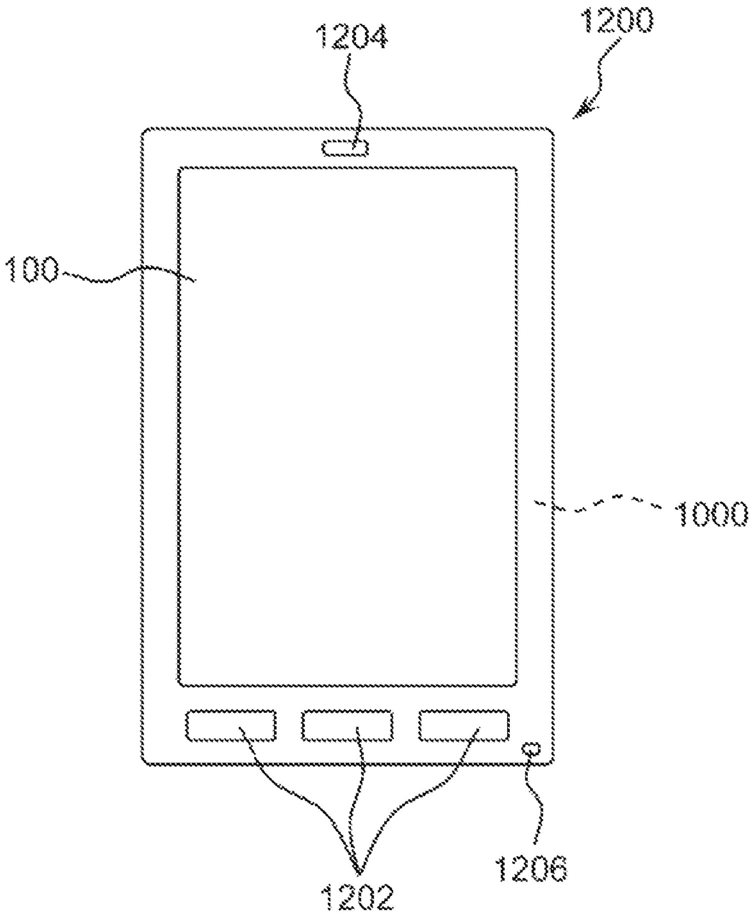
FIG. 5 is a plan view showing a smartphone which is an electronic device including the magnetic element according to the embodiment.

FIG. 5 is a plan view showing a smartphone which is an electronic device including the magnetic element according to the embodiment. A smartphone 1200 shown in FIG. 5 includes a plurality of operation buttons 1202, an earpiece 1204, and a mouthpiece 1206. In addition, the display 100 is disposed between the operation buttons 1202 and the earpiece 1204. Such a smartphone 1200 is incorporated with the magnetic element 1000 such as an inductor, a noise filter, and a motor.

Figure 6:
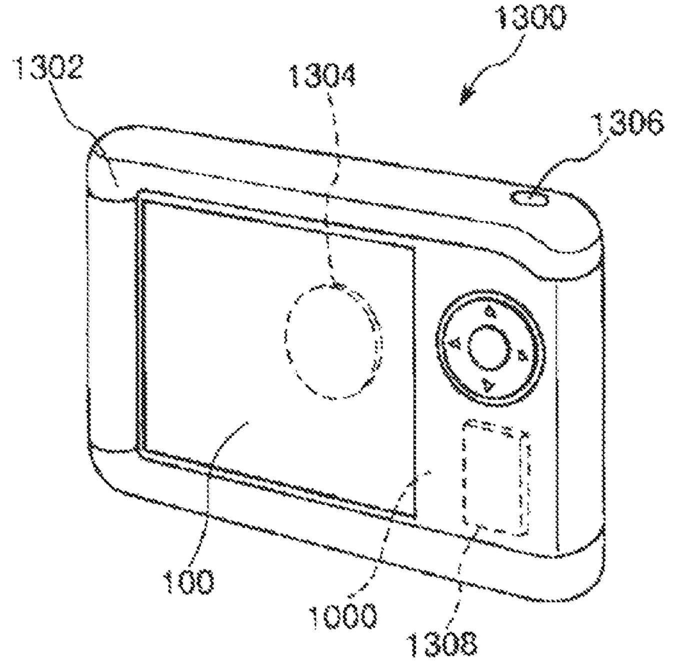
FIG. 6 is a perspective view showing a digital still camera which is an electronic device including the magnetic element according to the embodiment.

FIG. 6 is a perspective view showing a digital still camera which is an electronic device including the magnetic element according to the embodiment. A digital still camera 1300 photoelectrically converts an optical image of a subject by an imaging element such as a charge coupled device (CCD) to generate an imaging signal.

The digital still camera 1300 shown in FIG. 6 includes the display 100 provided at a rear surface of a case 1302. The display 100 functions as a finder that displays the subject as an electronic image. In addition, a light receiving unit 1304 including an optical lens, the CCD, and the like is provided at a front surface of the case 1302, that is, at a rear surface in the drawing.

When a photographer confirms a subject image displayed on the display 100 and presses a shutter button 1306, the imaging signal of the CCD at that time is transferred and stored in a memory 1308. Such a digital still camera 1300 is also incorporated with the magnetic element 1000 such as an inductor or a noise filter.

Examples of the electronic device according to the embodiment include, in addition to the personal computer of FIG. 4, the smartphone of FIG. 5, and the digital still camera of FIG. 6, for example, a mobile phone, a tablet terminal, a watch, ink jet discharge devices such as an ink jet printer, a laptop personal computer, a television, a video camera, a video tape recorder, a car navigation device, a pager, an electronic notebook, an electronic dictionary, a calculator, an electronic game device, a word processor, a workstation, a videophone, a crime prevention television monitor, electronic binoculars, a POS terminal, medical devices such as an electronic thermometer, a blood pressure meter, a blood glucose meter, an electrocardiogram measuring device, an ultrasonic diagnostic device, and an electronic endoscope, a fish finder, various measuring devices, instruments for a vehicle, an aircraft, and a ship, vehicle control devices such as an automobile control device, an aircraft control device, a railway vehicle control device, and a ship control device, and a flight simulator.

As described above, such an electronic device includes the magnetic element according to the embodiment. Accordingly, it is possible to exert the effect of the magnetic element having low coercive force and low core loss and achieve high performance of the electronic device.

5. Vehicle

Next, a vehicle including the magnetic element according to the present embodiment will be described with reference to FIG. 7.

Figure 7:
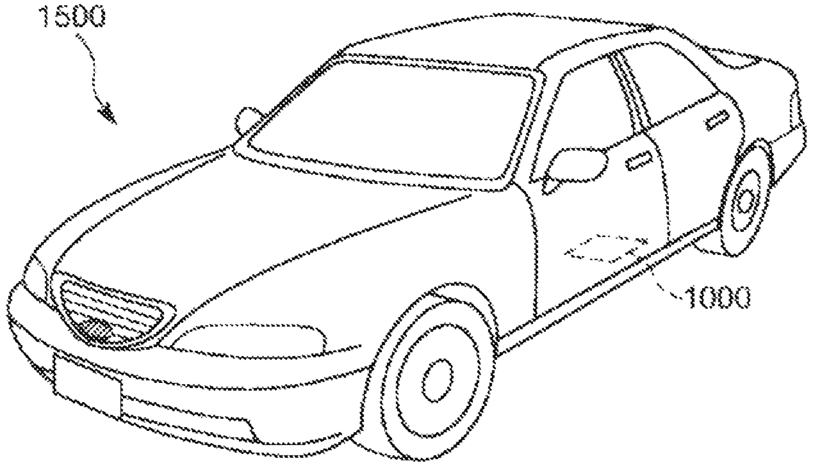
FIG. 7 is a perspective view showing an automobile which is a vehicle including the magnetic element according to the embodiment.

FIG. 7 is a perspective view showing an automobile which is the vehicle including the magnetic element according to the embodiment.

An automobile 1500 is incorporated with the magnetic element 1000. Specifically, the magnetic element 1000 is incorporated in various automobile parts such as a car navigation system, an anti-lock brake system (ABS), an engine control unit, a battery control unit of a hybrid vehicle or an electric vehicle, a vehicle body posture control system, an electronic control unit (ECU) such as an automatic driving system, a driving motor, a generator, and an air conditioning unit.

As described above, such a vehicle includes the magnetic element according to the embodiment. Accordingly, it is possible to exert the effect of the magnetic element having low coercive force and low core loss and achieve high performance of the vehicle.

The vehicle according to the present embodiment may be, in addition to the automobile shown in FIG. 7, for example, a two-wheeled vehicle, a bicycle, an aircraft, a helicopter, a drone, a ship, a submarine, a railway, a rocket, and a spacecraft.

The soft magnetic powder, the dust core, the magnetic element, the electronic device, and the vehicle according to the present disclosure have been described above based on the preferred embodiment, and the present disclosure is not limited thereto.

For example, in the above embodiment, a compact such as a dust core has been described as an application example of the soft magnetic powder according to the present disclosure, but the application example is not limited thereto. The application example of the soft magnetic powder may be a magnetic device such as a magnetic fluid, a magnetic head, and a magnetic shielding sheet.

In addition, the shapes of the dust core and the magnetic element are not limited to those shown in the drawings, and may be any shapes.

EXAMPLES

Next, specific examples of the present disclosure will be described.

6. Manufacturing of Raw Material Powder 6.1 Raw Material Powders Nos. 1 to 3

Soft magnetic powders of raw material powders Nos. 1 to 3 were manufactured by the rotary water atomization method. Attributes of the soft magnetic powders of the raw material powders Nos. 1 to 3 are as shown in Table 1.

6.2. Raw Material Powders Nos. 4 to 7

Soft magnetic powders of raw material powders No. 4 to 7 were manufactured by the water atomization method.

Attributes of the soft magnetic powders of the raw material powders Nos. 4 to 7 are as shown in Table 1.

6.3. Raw Material Powder No. 8

A soft magnetic powder of a raw material powder No. 8 was manufactured by the rotary water atomization method. Attributes of the soft magnetic powder of the raw material powder No. 8 are as shown in Table 1.

7. Evaluation on Raw Material Powder 7.1. Average Particle Diameter

The volume-based particle size distribution of the soft magnetic powder of each raw material powder No. was obtained by the laser diffraction scattering type particle size distribution measuring device. The average particle diameters were calculated based on the obtained particle size distributions. Each of the average particle diameters is a particle diameter when the relative particle amount is 50 vol %. The obtained average particle diameters are shown in Table 1.

7.2. Coercive Force

The coercive force of the soft magnetic powder of each raw material powder No. was measured using a VSM system TM-VSM1230-MHHL manufactured by Tamakawa Co., Ltd., as a magnetization measuring device. Measurement results are shown in Table 1.

7.3. Magnetic Loss (Core Loss)

The magnetic loss (core loss) of the soft magnetic powder of each raw material powder No. was measured by the following method.

First, a methyl ethyl ketone solution of an epoxy-based resin as the binder was added to the soft magnetic powder of each raw material powder No. in an addition amount of 2.0 mass % in terms of solid content. The mixture was mixed and dried to form a mass. The mass was pulverized, then was press-molded, at a molding pressure of 294 MPa, into a ring shape having an outer diameter ϕ of 14 mm, an inner diameter ϕ of 7 mm, and a thickness of 3 mm, and then was heated at 150° C. for 30 minutes to obtain a toroidal core.

Next, the core loss Pcv of the obtained toroidal core was measured. As measurement conditions, the number of turns of a primary coil and the number of turns of a secondary coil were 36, respectively, the measurement frequency was 1 MHz, the maximum magnetic flux density was 30 mT, and the magnetic permeability p' was 21. Measurement results are shown in Table 1.

7.4. Magnetic Permeability

The magnetic permeability of the soft magnetic powder of each raw material powder No. was measured by the following method.

First, the methyl ethyl ketone solution of an epoxy-based resin as the binder was added to the soft magnetic powder of each raw material powder No. in an addition amount of 2.0 mass % in terms of solid content. The mixture was mixed and dried to form a mass. The mass was pulverized, then was press-molded, at a molding pressure of 294 MPa, into a ring shape having an outer diameter ϕ of 14 mm, an inner diameter ϕ of 7 mm, and a thickness of 3 mm, and then was heated at 150° C. for 30 minutes to obtain a toroidal core.

Next, the magnetic permeability of the toroidal core at a frequency of 1 MHz was measured using a 4294A precision impedance analyzer manufactured by Agilent. Measurement results are shown in Table 1.

TABLE 1

| | Alloy composition (Atomic Ratio) | Crystal structure — | Manufacturing method — | Average particle diameter μm | Coercive force Oe | Magnetic loss (Core loss) kW/m$^3$ | Magnetic permeability — |
|---|---|---|---|---|---|---|---|
| Raw material powder No. 1 | $Fe_{73.5}Cu_1Nb_3Si_{13.5}B_9$ | Microcrystalline (Nanocrystalline) | Rotary water atomization method | 24.0 | 0.4 | 160 | 25 |
| Raw material powder No. 2 | $Fe_{73.5}Cu_1Nb_3Si_{13.5}B_9$ | Microcrystalline (Nanocrystalline) | Rotary water atomization method | 16.0 | 0.7 | 140 | 23 |
| Raw material powder No. 3 | $(Fe_{0.97}Cr_{0.03})_{76}(Si_{0.5}B_{0.5})_{22}C_2$ | Amorphous | Rotary water atomization method | 24.0 | 0.9 | 390 | 23 |
| Raw material powder No. 4 | $(Fe_{0.97}Cr_{0.03})_{76}(Si_{0.5}B_{0.5})_{22}C_2$ | Amorphous | Water atomization method | 3.1 | 1.8 | 180 | 17 |
| Raw material powder No. 5 | $Fe_{73.5}Cu_1Nb_3Si_{13.5}B_9$ | Microcrystalline (Nanocrystalline) | Water atomization method | 3.3 | 1.2 | 145 | 18 |
| Raw material powder No. 6 | $Fe_{73.5}Cu_1Nb_3Si_{13.5}B_9$ | Microcrystalline (Nanocrystalline) | Water atomization method | 5.2 | 1.1 | 135 | 19 |
| Raw material powder No. 7 | $Fe_{73.5}Cu_1Nb_3S_{13.5}B_9$ | Microcrystalline (Nanocrystalline) | Water atomization method | 8.1 | 1.0 | 142 | 20 |
| Raw material powder No. 8 | $Fe_{73.5}Cu_1Nb_3Si_{13.5}B_9$ | Microcrystalline (Nanocrystalline) | Rotary water atomization method | 42.0 | 1.0 | 200 | 26 |

8. Manufacturing of Soft Magnetic Powder

8.1. Example 1

The raw material powder No. 5 was used as the first powder, the raw material powder No. 1 was used as the second powder, and the powders were mixed. Accordingly, a soft magnetic powder was obtained. Mixing conditions of the first powder and the second powder are as shown in Table 2.

8.2. Examples 2 to 17

Soft magnetic powders were obtained in the same manner as in Example 1 except that the mixing conditions of the first powder and the second powder were changed as shown in Table 2 or 3.

8.3. Comparative Examples 1 to 4

Soft magnetic powders were obtained in the same manner as in Example 1 except that the manufacturing conditions of the soft magnetic powders were set as shown in Table 2 or 3.

TABLE 2

| | First powder | | | Second powder | | | Mixing ratio |
|---|---|---|---|---|---|---|---|
| | Raw material powder No. — | Crystal structure — | Average particle diameter μm | Raw material powder No. — | Crystal structure — | Average particle diameter μm | First powder:second powder (Mass ratio) |
| Example 1 | No. 5 | Microcrystalline | 3.3 | No. 1 | Microcrystalline | 24.0 | 5:5 |
| Example 2 | No. 5 | Microcrystalline | 3.3 | No. 1 | Microcrystalline | 24.0 | 4:6 |
| Example 3 | No. 5 | Microcrystalline | 3.3 | No. 1 | Microcrystalline | 24.0 | 3:7 |
| Example 4 | No. 5 | Microcrystalline | 3.3 | No. 1 | Microcrystalline | 24.0 | 2:8 |
| Example 5 | No. 5 | Microcrystalline | 3.3 | No. 1 | Microcrystalline | 24.0 | 1:9 |
| Example 6 | No. 6 | Microcrystalline | 5.2 | No. 1 | Microcrystalline | 24.0 | 5:5 |
| Example 7 | No. 6 | Microcrystalline | 5.2 | No. 1 | Microcrystalline | 24.0 | 4:6 |
| Example 8 | No. 6 | Microcrystalline | 5.2 | No. 1 | Microcrystalline | 24.0 | 3:7 |
| Example 9 | No. 6 | Microcrystalline | 5.2 | No. 1 | Microcrystalline | 24.0 | 2:8 |
| Example 10 | No. 7 | Microcrystalline | 8.1 | No. 1 | Microcrystalline | 24.0 | 5:5 |
| Example 11 | No. 7 | Microcrystalline | 8.1 | No. 1 | Microcrystalline | 24.0 | 4:6 |
| Example 12 | No. 7 | Microcrystalline | 8.1 | No. 1 | Microcrystalline | 24.0 | 3:7 |
| Example 13 | No. 7 | Microcrystalline | 8.1 | No. 1 | Microcrystalline | 24.0 | 2:8 |
| Example 14 | No. 7 | Microcrystalline | 8.1 | No. 1 | Microcrystalline | 24.0 | 1:9 |
| Example 15 | No. 5 | Microcrystalline | 3.3 | No. 2 | Microcrystalline | 16.0 | 4:6 |

TABLE 2-continued

| | First powder | | | Second powder | | | Mixing ratio |
|---|---|---|---|---|---|---|---|
| | Raw material powder No. — | Crystal structure — | Average particle diameter µm | Raw material powder No. — | Crystal structure — | Average particle diameter µm | First powder:second powder (Mass ratio) |
| Comparative Example 1 | No. 5 | Microcrystalline | 3.3 | No. 1 | Microcrystalline | 24.0 | 8:2 |
| Comparative Example 2 | No. 6 | Microcrystalline | 5.2 | No. 1 | Microcrystalline | 24.0 | 1:9 |
| Comparative Example 3 | No. 5 | Microcrystalline | 3.3 | No. 1 | Microcrystalline | 42.0 | 5:5 |

TABLE 3

| | First powder | | | Second powder | | | |
|---|---|---|---|---|---|---|---|
| | Raw material powder No. — | Crystal structure — | Average particle diameter µm | Raw material powder No. — | Crystal structure — | Average particle diameter µm | Mixing ratio First powder:second powder (Mass Ratio) |
| Example 16 | No. 4 | Amorphous | 3.1 | No. 1 | Microcrystalline | 24.0 | 4:6 |
| Example 17 | No. 4 | Amorphous | 3.1 | No. 3 | Amorphous | 24.0 | 4:6 |
| Comparative Example 4 | No. 4 | Amorphous | 3.1 | No. 1 | Microcrystalline | 24.0 | 8:2 |

9. Evaluation on Soft Magnetic Powder

9.1. Particle Size Distribution

The volume-based particle size distribution of the soft magnetic powder of each of the examples and comparative examples was obtained by the laser diffraction scattering type particle size distribution measuring device. Then, the particle size distribution curve was created based on the obtained particle size distributions. When the obtained particle size distribution curve has a bimodal distribution, the particle diameter D1, the particle diameter D2, the difference D2−D1, the coefficient k1, the height H1, the height H2, the coefficient k2, the height H3, and the coefficient k3 are shown in Tables 4 and 5. On the other hand, when the obtained particle size distribution curve does not have a bimodal distribution, only one of the particle diameter D1 and the particle diameter D2 and only one of the height H1 and the height H2 are shown in Tables 4 and 5.

Figure 8:
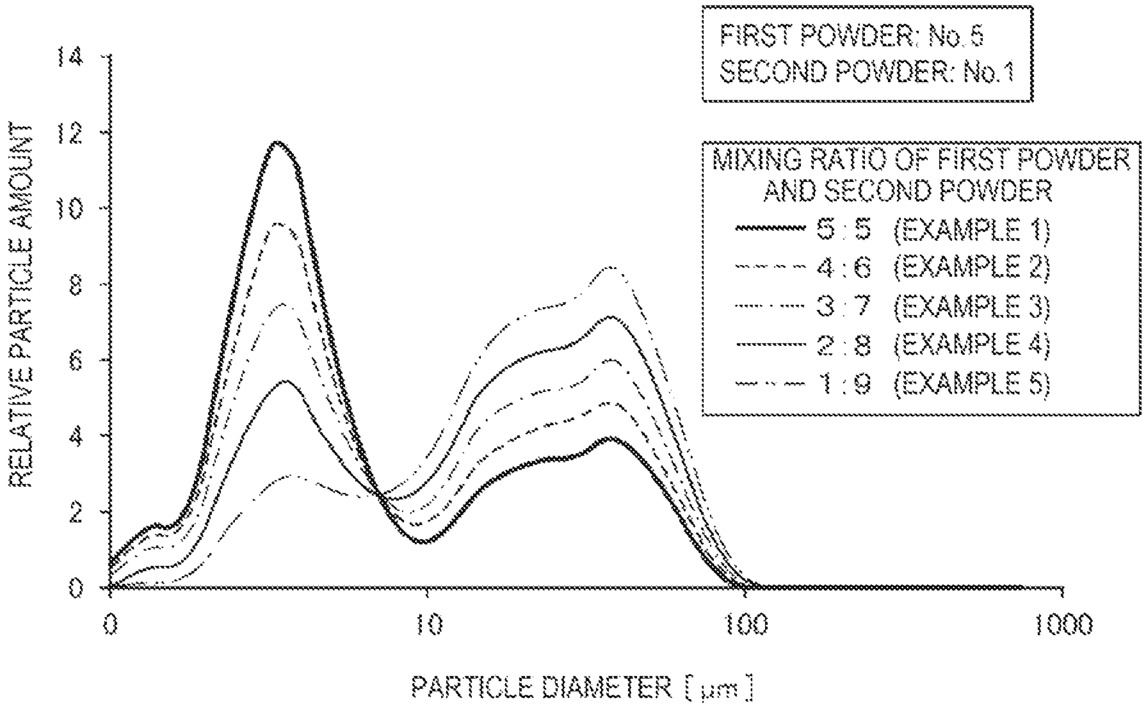
FIG. 8 is a graph showing particle size distribution curves obtained for soft magnetic powders of Examples 1 to 5 in an overlapping manner.
Figure 9:
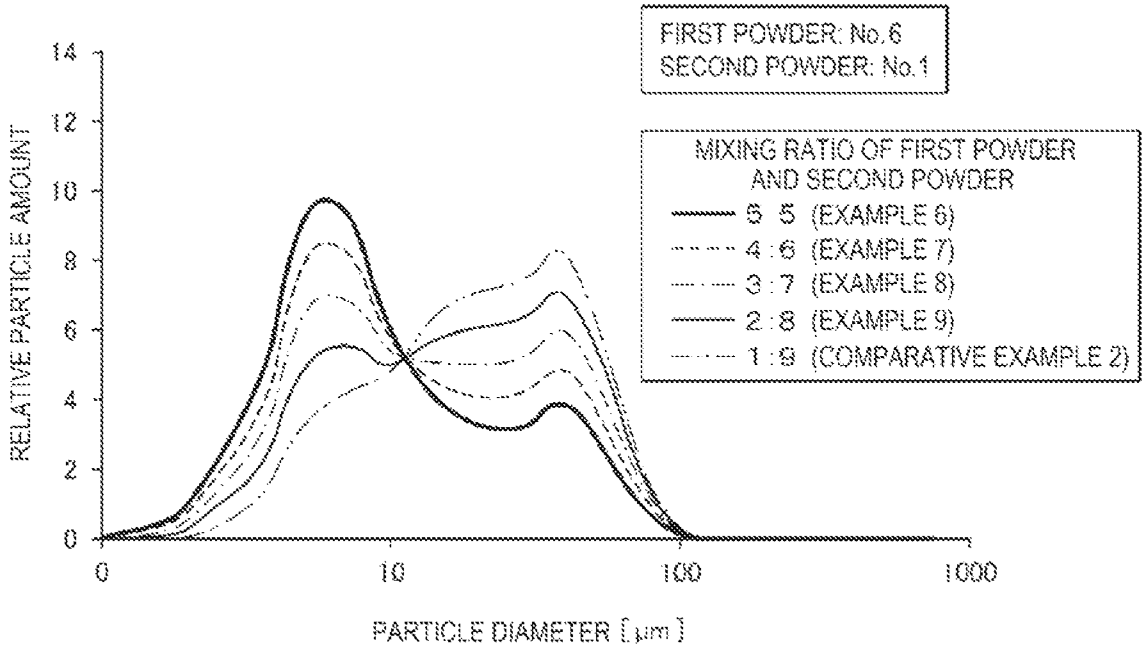
FIG. 9 is a graph showing particle size distribution curves obtained for soft magnetic powders of Examples 6 to 9 and Comparative Example 2 in an overlapping manner.
Figure 10:
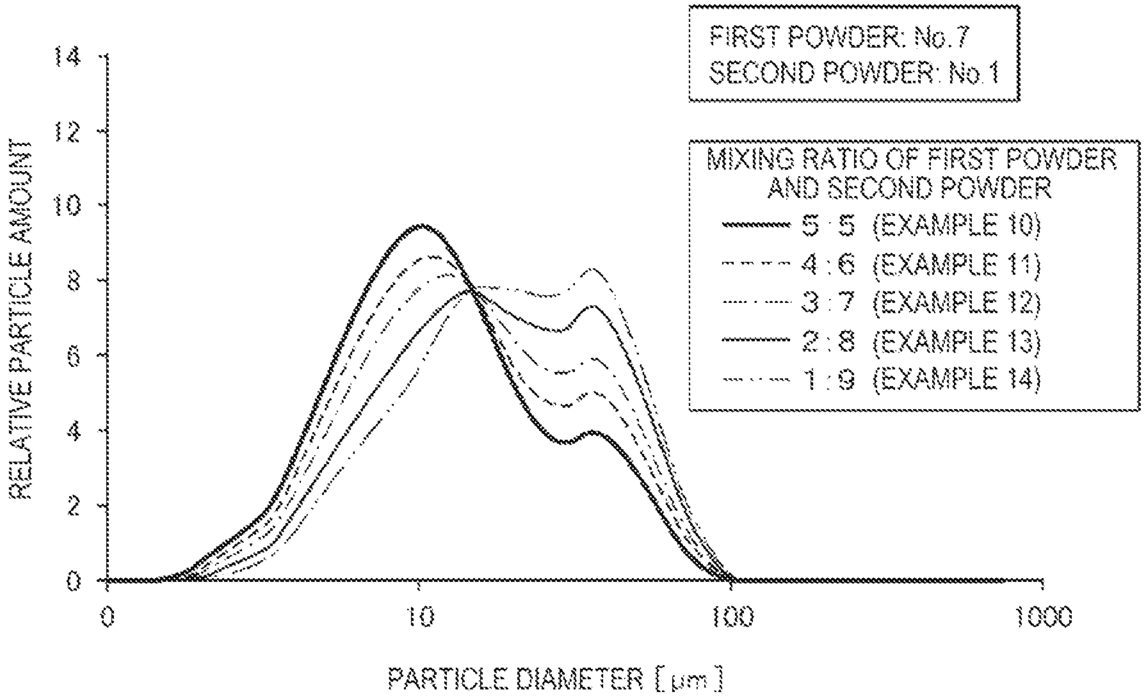
FIG. 10 is a graph showing particle size distribution curves obtained for soft magnetic powders of Examples 10 to 14 in an overlapping manner.

FIG. 8 is a graph showing particle size distribution curves obtained for the soft magnetic powders of Examples 1 to 5 in an overlapping manner. FIG. 9 is a graph showing particle size distribution curves obtained for the soft magnetic powders of Examples 6 to 9 and Comparative Example 2 in an overlapping manner. FIG. 10 is a graph showing particle size distribution curves obtained for the soft magnetic powders of Examples 10 to 14 in an overlapping manner. In FIGS. 8 to 10, a mixing ratio of the first powder and the second powder is, for example, 5:5.

As shown in FIGS. 8 to 10, by changing the mixing ratio of the first powder and the second powder, the height of the first peak P1, the height of the second peak P2, and the height of the bottom portion B can be controlled according to the mixing ratio.

9.2. Magnetic Loss (Core Loss)

A toroidal core was manufactured by the same method as 7.3 using the soft magnetic powder of each of the examples and the comparative examples. Next, the core loss Pcv of the obtained toroidal core was measured. The measurement conditions were the same as 7.3. Measurement results are shown in Table 4 or 5.

9.3. Magnetic Permeability

A toroidal core was manufactured by the same method as 7.4 using the soft magnetic powder of each of the examples and the comparative examples. Next, the magnetic permeability of the obtained toroidal core was measured by the same method as 7.4. Measurement results are shown in Table 4 or 5.

TABLE 4

| | Parameter representing bimodal distribution | | | | | | | | | Evaluation results | |
|---|---|---|---|---|---|---|---|---|---|---|---|
| | Position of peak | | | | Height of peak | | | Height of bottom portion | | Magnetic loss (Core loss) | Magnetic permeability |
| | D1 μm | D2 μm | D2 − D1 μm | k1 — | H1 — | H2 — | k2 — | H3 — | k3 — | kW/$m^3$ | — |
| Example 1 | 3.3 | 37.0 | 33.7 | 10.2 | 11.7 | 4.0 | 0.3 | 1.3 | 0.1 | 122 | 26 |
| Example 2 | 3.3 | 37.0 | 33.7 | 10.2 | 9.6 | 4.9 | 0.5 | 1.7 | 0.2 | 100 | 29 |
| Example 3 | 3.3 | 37.0 | 33.7 | 10.2 | 7.4 | 6.0 | 0.8 | 2.1 | 0.3 | 105 | 32 |
| Example 4 | 3.3 | 37.0 | 33.7 | 10.2 | 5.4 | 7.2 | 1.3 | 2.4 | 0.4 | 114 | 31 |
| Example 5 | 3.9 | 37.0 | 33.1 | 8.5 | 3.0 | 8.5 | 2.8 | 2.5 | 0.8 | 126 | 29 |
| Example 6 | 5.5 | 37.0 | 31.5 | 5.7 | 9.7 | 3.9 | 0.4 | 3.2 | 0.3 | 118 | 26 |
| Example 7 | 6.5 | 37.0 | 30.5 | 4.7 | 8.5 | 4.9 | 0.6 | 4.1 | 0.5 | 96 | 29 |
| Example 8 | 6.5 | 37.0 | 30.5 | 4.7 | 7.0 | 6.0 | 0.9 | 5.0 | 0.7 | 101 | 32 |
| Example 9 | 6.5 | 37.0 | 30.5 | 4.7 | 5.6 | 7.2 | 1.3 | 5.1 | 0.9 | 120 | 24 |
| Example 10 | 11.0 | 37.0 | 26.0 | 2.4 | 9.3 | 3.9 | 0.4 | 3.6 | 0.4 | 114 | 31 |
| Example 11 | 11.0 | 37.0 | 26.0 | 2.4 | 8.5 | 5.0 | 0.6 | 4.6 | 0.5 | 98 | 33 |
| Example 12 | 13.1 | 37.0 | 23.9 | 1.8 | 8.1 | 5.9 | 0.7 | 5.5 | 0.7 | 103 | 35 |
| Example 13 | 13.0 | 37.0 | 24.0 | 1.8 | 7.5 | 7.2 | 1.0 | 6.6 | 0.9 | 118 | 33 |
| Example 14 | 15.6 | 37.0 | 21.4 | 1.4 | 7.7 | 8.2 | 1.1 | 7.5 | 1.0 | 125 | 30 |
| Example 15 | 3.3 | 22.0 | 18.7 | 5.7 | 9.5 | 5.1 | 0.5 | 1.4 | 0.1 | 105 | 20 |
| Comparative Example 1 | 3.3 | — | — | — | 15.0 | — | — | — | — | 140 | 17 |
| Comparative Example 2 | — | 37.0 | — | — | — | 8.5 | — | — | — | 130 | 18 |
| Comparative Example 3 | 3.3 | 62.0 | 58.7 | 17.8 | 12.0 | 3.0 | 0.3 | 0.5 | 0.0 | 180 | 19 |

TABLE 5

| | Parameter representing bimodal distribution | | | | | | | | | Evaluation results | |
|---|---|---|---|---|---|---|---|---|---|---|---|
| | Position of peak | | | | Height of peak | | | Height of bottom portion | | Magnetic loss (Core loss) | Magnetic permeability |
| | D1 μm | D2 μm | D2 − D1 μm | k1 — | H1 — | H2 — | k2 — | H3 — | k3 — | kW/$m^3$ | — |
| Example 16 | 3.3 | 31.0 | 27.7 | 8.4 | 9.0 | 4.7 | 0.5 | 1.6 | 0.2 | 102 | 30 |
| Example 17 | 3.3 | 31.0 | 27.7 | 8.4 | 8.8 | 4.8 | 0.5 | 1.5 | 0.2 | 210 | 25 |
| Comparative Example 4 | 3.3 | — | — | — | 15.0 | — | — | — | — | 170 | 20 |

As is clear from Tables 4 and 5, the soft magnetic powder of each example had a bimodal distribution in which the particle size distribution curve satisfied predetermined conditions. The compacts manufactured from the soft magnetic powders of the examples were better in both magnetic permeability and core loss than the compacts manufactured from the soft magnetic powders of the comparative examples. Accordingly, it is presumed that the soft magnetic powders of the examples have good filling properties and can manufacture a compact having a small eddy current loss when used in a high frequency band.

What is claimed is:

1. A soft magnetic powder comprising:

two or more types of particles having different crystal structures, at least one type of the particles having an amorphous crystal structure and at least one of the type of particles having a microcrystalline crystal structure, wherein when a volume-based particle size distribution is measured by a laser diffraction scattering type particle size distribution measuring device, and the particle size distribution is plotted in an orthogonal coordinate system in which a horizontal axis represents a particle diameter and a vertical axis represents a relative particle amount to draw a particle size distribution curve, the particle size distribution curve has a first peak having a local maximum at a particle diameter D1 [μm] and a second peak having a local maximum at a particle diameter D2 [μm] that is larger than the particle diameter D1, the particle diameter D1 is in a range of 1.0 μm or more and 16.0 μm or less, the particle diameter D2 is in a range of 15 μm or more and 50.0 μm or less, an amount of particles having the particle diameter D1 is greater than an amount of particles having the particle diameter D2, and a difference D2−D1 between the particle diameter D1 and the particle diameter D2 satisfies following formulas (A-1) and (A-2), $$D2-D1=k1\times D1 \quad \text{(A-1)}$$

$$1.0\leq k1\leq 15.0 \quad \text{(A-2)}.$$

2. The soft magnetic powder according to claim 1 comprising two or more types of particles having different alloy compositions.

3. The soft magnetic powder according to claim 1, wherein when a height of the first peak is represented by H1 and a height of the second peak is represented by H2, the height H2 satisfies following formulas (B-1) and (B-2):

$$H2=k2\times H1 \quad \text{(B-1)}$$

$$0.2\leq k2\leq 5.0 \quad \text{(B-2)}$$

4. The soft magnetic powder according to claim 3, wherein the particle size distribution curve has a bottom portion having a local minimum at a particle diameter D3 between the particle diameter D1 and the particle diameter D2, and when a height of the bottom portion is represented by H3, the height H3 satisfies following formulas (C-1) and (C-2):

$$H3=k3\times H1 \quad \text{(C-1)}$$

$$k3<0.9 \quad \text{(C-2)}$$

* * * * *